(12) United States Patent
Geerts

(10) Patent No.: US 9,476,621 B2
(45) Date of Patent: Oct. 25, 2016

(54) DEVICE AND METHOD FOR COOL DRYING A GAS

(75) Inventor: Bart Geerts, Wilrijk (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 343 days.

(21) Appl. No.: 13/884,846

(22) PCT Filed: Oct. 31, 2011

(86) PCT No.: PCT/BE2011/000062
§ 371 (c)(1),
(2), (4) Date: Jul. 27, 2013

(87) PCT Pub. No.: WO2012/065235
PCT Pub. Date: May 24, 2012

(65) Prior Publication Data
US 2013/0291572 A1    Nov. 7, 2013

(30) Foreign Application Priority Data

Nov. 16, 2010 (BE) .................................. 2010/0681

(51) Int. Cl.
*F25B 41/04* (2006.01)
*B01D 53/26* (2006.01)
*F25B 49/02* (2006.01)

(52) U.S. Cl.
CPC ............. *F25B 41/04* (2013.01); *B01D 53/265* (2013.01); *F25B 49/022* (2013.01); *F25B 2600/0261* (2013.01)

(58) Field of Classification Search
CPC ............ F25B 41/04; F25B 2400/0401; F25B 2600/026; F25B 2600/0261; F25B 2700/197; B01D 53/265
USPC ................................................ 62/196.3, 225
See application file for complete search history.

(56) References Cited

U.S. PATENT DOCUMENTS 3,037,362 A * 6/1962 Tilney et al. ................ 62/196.3
4,718,245 A   1/1988 Van Steenburgh, Jr.
(Continued)

FOREIGN PATENT DOCUMENTS

CN   1298085 A   6/2001
CN   1307499 A   8/2001
(Continued)

OTHER PUBLICATIONS

Breidenbach, Karl, Der Kalteanlagenbauer, vol. 2, 3rd ed., 1990; pp. 475 to 478 of chapter 77.3, "Leistungsregler" Verlag C.F. Muller GMBH, Karlsruhe.
Reisner, Klaus, Fachwissen Kaltetechnik fur die industrielle und gewerbliche Praxis, 3rd Ed., 2002; pp. 72-73 & 135-136, Himmer GMBH & Co. KG, Augsburg, Germany.
"Handbook of Cooling Technology", vol. 6, Part A (1969); editor PLANK, Rudolf, pp. 48-51 & 114-117, Springer-Verlag, Berlin/Heidelberg/New York.
(Continued)

*Primary Examiner* — Marc Norman
(74) *Attorney, Agent, or Firm* — Workman Nydegger

(57) ABSTRACT

A device for cool drying a gas in the direction of flow of the coolant includes a closed cooling circuit with successively a compressor, a condenser and an expansion device and an evaporator that is the primary part of a heat exchanger and that has a secondary part through which the gas to be dried is guided. A bypass pipe in the cooling circuit can be closed by a bypass valve with a valve element and a pressure-sensitive element acting on it that is exposed to a local control pressure in the cooling circuit. A control pressure pipe connects the pressure sensitive element to the closed cooling circuit upstream of the outlet of the evaporator.

19 Claims, 8 Drawing Sheets

(56) References Cited

U.S. PATENT DOCUMENTS

| | | | |
|---|---|---|---|
| 4,815,298 A | 3/1989 | Van Steenburgh, Jr. | |
| 6,393,850 B1 | 5/2002 | Vanderstraeten | |
| 2002/0174665 A1* | 11/2002 | Pritchard et al. | 62/93 |
| 2009/0025407 A1 | 1/2009 | Dalla Valle et al. | |

FOREIGN PATENT DOCUMENTS

| | | |
|---|---|---|
| EP | 1103296 A1 | 5/2001 |
| EP | 1 103 296 B1 | 9/2006 |
| WO | 38/03248 A1 | 1/1998 |
| WO | 99/61135 A1 | 12/1999 |
| WO | 2007/022604 A1 | 3/2007 |

OTHER PUBLICATIONS

Examiner Observations of European Patent App. No. 11799226.3, Jul. 17, 2014.
Chinese First Office Action from Application No. CN 201180055071.6, Jul. 24, 2014.
International Search Report issued in PCT/BE2011/000062, Apr. 12, 2013.
Rapin, et al., "Installations frigorifiques", Technologie, Tome 2, 7th Edition, PYC Edition Livres, 1996, pp. 387-389.
Ashrae Handbook & Product Directory, 1975 Equipment, American Society of Heating, Refrigerating and Air-Conditioning Engineers, Inc. New York, 1975, 4 pages.
Dpposition lodged against corresponding EP Application Patent No. 2640493, May 26, 2015, 19 pages.

* cited by examiner

DEVICE AND METHOD FOR COOL DRYING A GAS

BACKGROUND

The present invention relates to a device and method for cool drying a gas.

Cool drying is applied for example in compressors that supply a hot compressed gas that is often saturated with water.

This compressed gas first has to be dried before it can be supplied to a pneumatic network because the moisture in the gas can be harmful to the components and tools in the pneumatic network as moisture can lead to corrosion or the accumulation of water in tools that are not designed for that purpose.

Cool drying is based on the principle that by cooling a gas that is saturated or partly saturated with water, moisture is removed from the gas as the moisture condenses and the condensed water is removed, after which the gas is again heated up whereby it is no longer saturated and is thus dryer.

For cool drying, a device is used that primarily consists of a closed cooling circuit that contains a coolant that can be circulated in the circuit by a compressor and which further contains, successively in the direction of flow of the coolant, a condenser connected to an outlet of the compressor; an expansion means followed by an evaporator connected to an inlet of the aforementioned compressor, whereby the evaporator forms the primary part of a heat exchanger with a secondary part through which the gas to be dried is guided.

As a result of the evaporation of the coolant in the evaporator, or thus the primary part of the heat exchanger, as is known, heat is extracted from the gas to be dried flowing through the secondary part, whereby this gas to be dried is cooled and, after evacuation of the condensate formed, is heated up again.

Such a device is designed for a nominal load for drying a normal gas flow.

In the unloaded state, in other words when no gas to be dried is flowing through the heat exchanger, the cooling capacity of the cooling circuit is too high, such that freezing can occur in or after the evaporator, which must absolutely be avoided.

Moreover the coolant in the cooling circuit is continually pumped around without the cooling capacity of the cooling circuit being usefully employed for drying the gas, such that a lot of energy is lost.

A known solution to this is to provide a bypass pipe in the closed cooling circuit with a bypass valve in it, which, on the one hand, is closed when the device is loaded, or in other words when a gas to be dried flows through the heat exchanger and, on the other hand is open when the device is unloaded and thus no gas to be dried flows through the heat exchanger.

In loaded situations the bypass pipe thus has no effect as it is then closed, and as a result of this the cooling circuit operates at full capacity as the entire flow of coolant that is compressed by the compressor is also guided through the condenser and the expansion means, which together ensure considerable cooling of the coolant, and as this full flow of cold coolant also flows through the evaporator in the heat exchanger to cool the gas to be dried.

In the unloaded state on the other hand the open valve ensures that the compressor is bypassed and that, as a result of this, at least a part of the coolant compressed by the compressor does not flow through the condenser and the expansion means and this part of the coolant is thus not cooled by expansion such that there is much less cooling in the evaporator and thus there is much less risk of freezing in or downstream of the evaporator.

Downstream and upstream are considered in the direction of flow of the coolant in the closed cooling circuit.

For a bypass valve that can fulfil the aforementioned functions, it is known to use a type of valve known by the name of 'hot gas bypass' (HGBP), and more specifically this type of valve is a pressure-controlled bypass valve with a valve element that is held in a closed position under the influence of a spring element to close the bypass pipe, and which is also provided with a pressure-sensitive element that acts on the aforementioned valve element, and which, when it is subject to a sufficient pressure drop, can open the valve against the spring force.

In the known devices, the pressure-sensitive element is exposed to a control pressure that is tapped off locally from a point downstream of the evaporator via an internal control pressure pipe in the circuit, more specifically at the point where the bypass pipe leads into the cooling circuit.

When such a device changes from an unloaded state to a loaded state through a quantity of gas to be dried suddenly being driven through the heat exchanger, the temperature in the evaporator increases due to the heat transfer from the gas to be dried to the cooler coolant in the evaporator, such that more coolant evaporates in the evaporator, which itself increases the pressure in the evaporator and also downstream of the evaporator, and this pressure increase is felt by the bypass valve which will thereby close when the pressure increase is sufficient.

A feature of the control characteristic of an HGBP valve is a given pressure difference of the control pressure between the unloaded and loaded state, which in known devices in a loaded state results in a relatively high pressure of the coolant at the outlet of the evaporator, and thus also in the evaporator where the pressure is even higher as a result of the frictional losses that occur when coolant flows through the evaporator.

As the coolant in the closed cooling circuit is in a two-phase region, there is an unambiguous relationship between the pressure and temperature of the coolant: a higher pressure in the evaporator also implies a higher temperature in the evaporator.

This leads to the disadvantage that the gas to be dried is not cooled optimally for drying by the evaporator, which results in a higher pressure dew point of the gas at the outlet of the secondary part of the heat exchanger, whereby at this outlet the aim is for the lowest possible temperature (the lowest temperature of the gas to be dried is also called the LAT or 'Lowest Air Temperature'—although the term LAT is also used for gases other than air) and corresponding pressure dew point of the gas for good drying.

SUMMARY

The purpose of the present invention is to provide a solution to one or more of the aforementioned and/or other disadvantages by providing a device for cool drying a gas that primarily consists of a closed cooling circuit that contains a coolant that can be circulated in the cooling circuit by a compressor, and which further in the direction of flow of the coolant successively comprises a condenser connected to the outlet of the compressor; an expansion means followed by an evaporator connected to the inlet of the aforementioned compressor, whereby the evaporator constitutes the primary part of a heat exchanger with a secondary part through which the gas to be dried is guided, and whereby there is a bypass pipe in the cooling circuit that can be closed by means of a bypass valve with a valve element that is kept in a closed position under the influence of a spring element and with a pressure-sensitive element that acts on the valve element, and which, via a control pressure pipe, is exposed to a local control pressure in the circuit where the control pressure pipe is connected to the circuit, whereby the control pressure pipe is connected to the closed cooling circuit upstream of the outlet of the evaporator.

By connecting the control pressure pipe at a point of the cooling circuit upstream of the evaporator outlet, for example in the evaporator or upstream of the evaporator, instead of downstream as in the known devices, and this in a device that is otherwise identical, a number of important advantages are obtained.

An advantage is that when the cool dryer is loaded, the pressure and temperature of the coolant in the evaporator and at its outlet is less than with a conventional connection downstream, such that the gas to be dried can be cooled more intensively to a lower pressure dew point and thereby more liquid can be removed from the gas to be dried through condensation, with better drying as a result.

An advantage attached to this is that to dry a given flow of gas with a certain desired lowest air temperature (LAT) at the outlet of the secondary part of the heat exchanger, a smaller and more compact exchanger is sufficient, or that with a given heat exchanger the same flow rate can be cooled to a lower LAT.

Another advantage is that the pressure dew point only increases slightly during the transition from the unloaded to the loaded state, and that in the event of a varying load the pressure dew point varies less and is thus more constant.

In a preferred embodiment, an additional restrictor can be placed in the cooling circuit upstream of the evaporator, more specifically between the evaporator and the point upstream of the evaporator where the control pressure pipe is connected to the cooling circuit.

This has the beneficial effect that the average pressure in the evaporator and at the outlet of the evaporator in a loaded state will decrease even more and come closer to the pressure in the unloaded state, such that the aforementioned advantages are amplified.

The invention also relates to a method for cool drying a gas by means of a device that primarily consists of a closed cooling circuit that contains a coolant that is circulated in the cooling circuit by a compressor and which further comprises, successively in the direction of flow of the coolant, a condenser connected to the outlet of the compressor; an expansion means followed by an evaporator connected to the inlet of the aforementioned compressor, whereby the evaporator constitutes the primary part of a heat exchanger with a secondary part through which the gas to be dried is guided and whereby there is a bypass pipe in the cooling circuit that can be closed by means of a bypass valve with a valve element that is kept in a closed position under the influence of a spring element, whereby when the device is loaded, the bypass valve is opened against the spring force of the spring element when the pressure in the closed cooling circuit, at a point upstream of the outlet of the evaporator, is higher than a set value.

BRIEF DESCRIPTION OF DRAWINGS

With the intention of better showing the characteristics of the invention, a preferred embodiment of a device according to the invention for cool drying a gas and a method applied with it is described hereinafter by way of an example, without any limiting nature, with reference to the accompanying drawings, wherein.

DETAILED DESCRIPTION OF VARIOUS EMBODIMENTS

Figure 1:
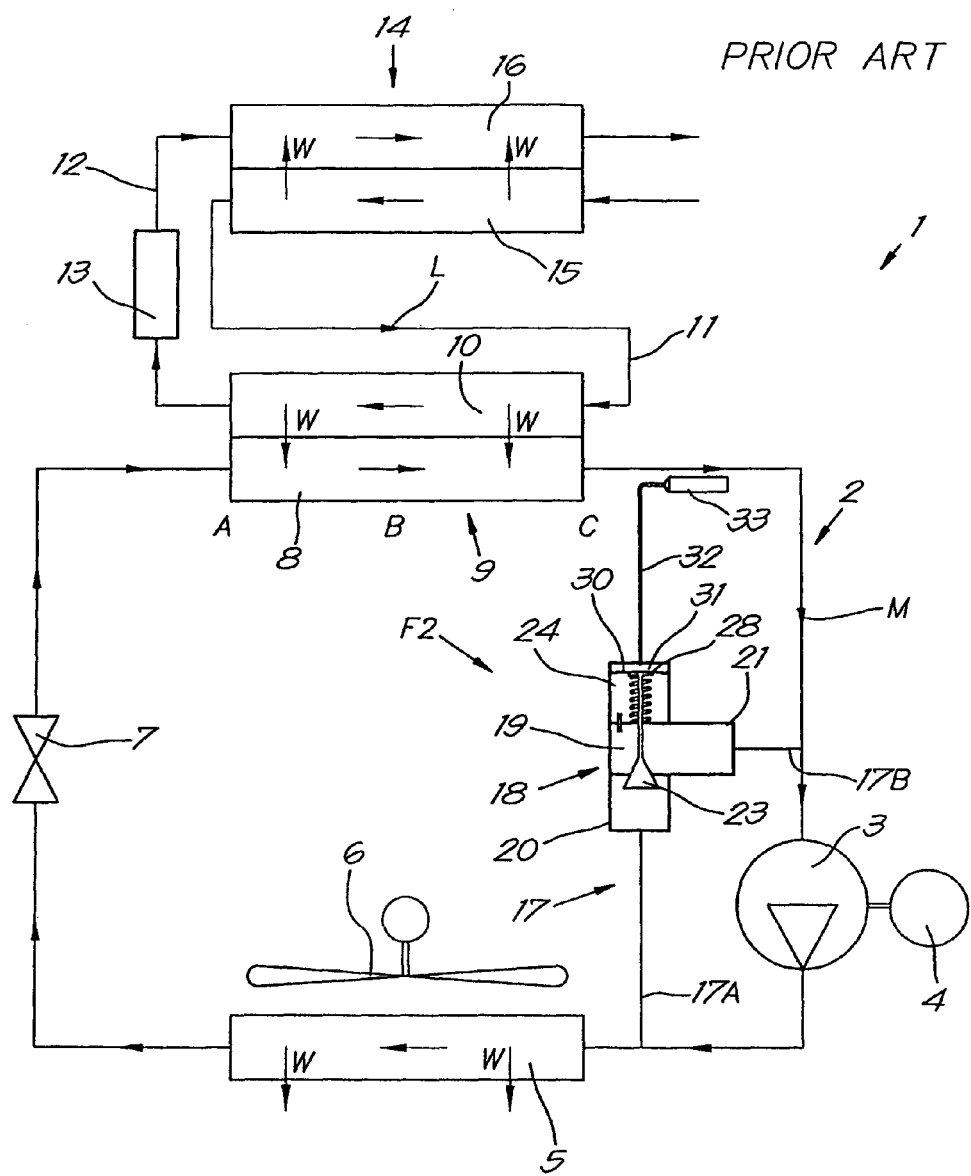
FIG. 1 schematically shows a device for cool drying of the known type in the fully loaded state.

The known device 1 for cool drying gases shown in FIG. 1 comprises a cooling circuit 2 that contains a coolant that can be circulated in the circuit by a compressor 3 driven by means of a motor 4 or similar, preferably but not necessarily, a motor with a constant speed.

The direction of flow of the coolant in the circuit is indicated by the arrows M. Upstream and downstream are defined according to this direction of flow M.

Further the cooling circuit 2 contains, successively in the direction of flow of the coolant, a condenser 5 connected to an outlet of the compressor 3 and which for example is cooled by means of a fan 6; expansion means 7, for example in the form of an expansion valve; an evaporator 8 connected to an inlet of the aforementioned compressor 3 and which forms part of a heat exchanger 9 with a primary part that is formed by the evaporator 8 and a secondary part through which the gas to be dried is driven in the direction of the arrows L via a supply pipe 11 in order to be cooled by the evaporator 8.

The gas cooled in the heat exchanger 8 is first driven through a liquid separator 13 via an outlet pipe 12 and then through a heat exchanger 14 to again heat up the cooled gas.

In this case this heat exchanger 14 makes use of the recuperation heat contained in the supplied gas to be dried and to this end consists of a primary part 15 that is incorporated in the aforementioned supply pipe 11 and a secondary part 16 that is incorporated in the outlet pipe 12.

The presence of the liquid separator 13 and heat exchanger 14 is not necessary and can be omitted for certain applications in which the dried air is still partially or entirely saturated with water.

The cooling circuit 2 is further equipped with a bypass pipe 17 connected to the cooling circuit 2 in order to bypass the compressor 3, and which to this end is placed between the inlet and outlet of the compressor 3.

The bypass pipe 17 can be closed by means of a bypass valve 18 that is placed between a first section 17A of the bypass pipe 17 connected to the cooling circuit 2 on the outlet side of the compressor 3, and a second section 17B connected to the cooling circuit 2 along the inlet side of the compressor 3, more specifically downstream of the evaporator 8.

The bypass valve 18 is equipped with a flow-through channel 19 with an inlet 20 connected to the first section 17A of the bypass pipe 17 and an outlet 21 connected to the second section 17B of the bypass pipe 17.

Figure 2:
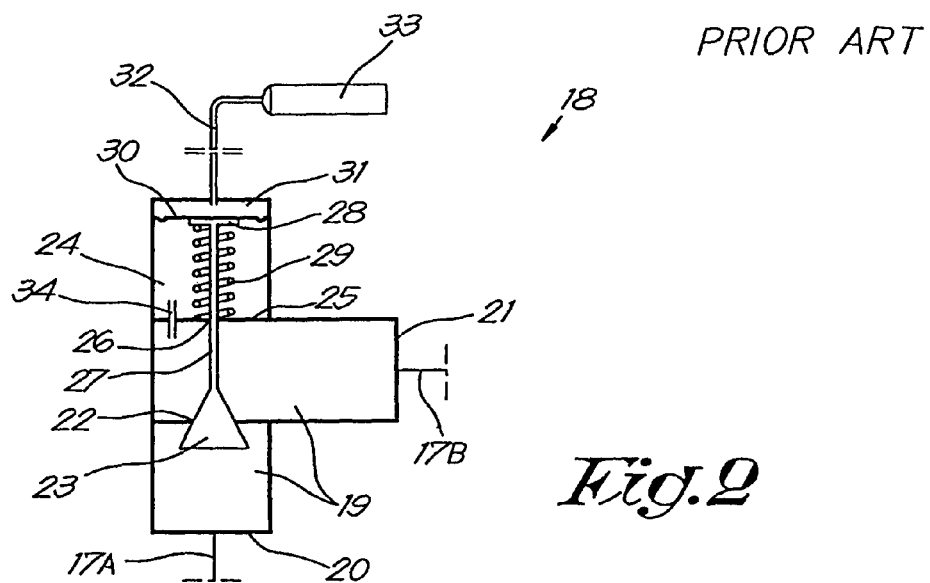
FIG. 2 shows the section designated in FIG. 1 by the arrow F2 on a larger scale.

As shown in more detail in FIG. 2, the inlet 20 is separated from the outlet 21 by a passage 22 that can be closed off by means of a valve element 23.

The bypass valve 18 further comprises a closed pressure chamber 24 that is separated from the flow-through channel 19 by a separating wall 25 with a wall passage 26.

The valve element 23 has a valve stem 27 that partially extends through the aforementioned wall passage 26 into the pressure chamber 24, and which at its end has a spring seat for a spring 29 that is compressed between the aforementioned separating wall 25 and the spring seat 28 and which keeps the valve element 23 in a closed state.

The pressure chamber 24 has a pressure-sensitive element, for example in the form of a membrane 30 that closes off the pressure chamber 24 and which is in contact with the aforementioned spring seat 28.

The aforementioned membrane 30 forms a separation between the aforementioned pressure chamber 24 and a second pressure chamber 31 that is connected to a 'bulb' 33 via a capillary tube 32. As this bulb 33 is of no further importance for the invention, its role shall not be explained further.

The bypass valve 18 also has, in this case, an internal control pressure pipe 34 via which the pressure chamber 24 is connected to the outlet 21 in order to sense, via the section 17B of the bypass pipe 17, the pressure in the cooling circuit 2 downstream of the evaporator 8. It goes without saying that the control pressure pipe 34 can also be constructed in the form of an external pipe.

The operation of the known device 1 described above is illustrated in the loaded state on the basis of FIGS. 1 and 2 in which the bypass pipe 17 is closed by the bypass valve 18.

The motor 4 drives the compressor that circulates the coolant in the cooling circuit in the direction of the arrows. M.

The compressed gaseous coolant is then cooled in the condenser 5, such that it changes from the gas phase to the liquid phase.

The coolant then undergoes an expansion by the expansion means 7, such that the temperature of the coolant falls drastically.

This cooled coolant then flows through the evaporator 8 where it comes into thermal contact with the gas to be dried flowing through the secondary part 10 of the heat exchanger 9, of which the evaporator forms the primary part.

As a result, the gas to be dried is cooled and is generally saturated with water vapour, whereby the moisture in the gas condenses into droplets that can be removed via the liquid separator 13.

By heating up the cold gas after the liquid separator 13 in the heat exchanger 14, the relative humidity falls and the gas thus becomes dryer.

In the evaporator 8 the coolant that enters in the liquid phase evaporates due to the heat transfer from the gas to be dried to the coolant. The direction of the heat transfer in the heat exchangers is indicated by the arrows W.

The gas that leaves the evaporator 8 is again sucked in by the compressor 3 and is further pumped around the cooling circuit 2, so that the coolant can begin the next cooling cycle.

As a result of the evaporation of the coolant in the evaporator 8 the pressure in the evaporator, as well as downstream of the evaporator 8, increases, and thus also in the pressure chamber 24, which is connected to the cooling circuit 2 via the section 17B of the bypass pipe. Due to the relatively high pressure in the pressure chamber 24, the membrane 30 is loaded in the sense that it reinforces or counteracts less the action of the spring 29 on the valve element 23.

As a result the passage 22 is kept closed in loaded conditions by the valve element 23 and no coolant flows through the bypass pipe, such that the entire flow that is compressed by the compressor 3 also flows through the condenser 5, the expansion means 7 and the evaporator 8. Because this entire flow flows through the evaporator 8, there is also a relatively large pressure drop across the evaporator 8 due to the frictional losses of the flow.

Figure 3:
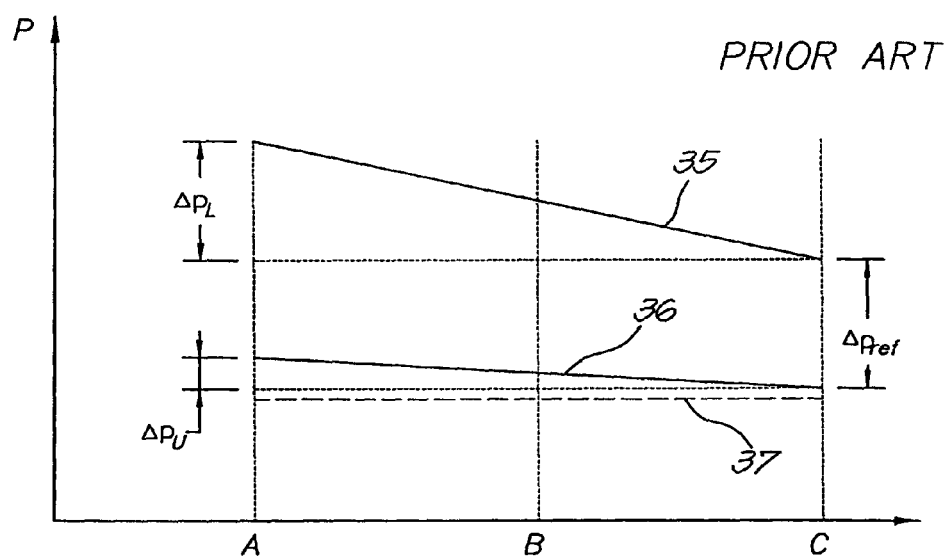
FIG. 3 shows the pressure curve of the coolant in the evaporator of FIG. 1.

The change of the average pressure along the path of the coolant through the evaporator 8 in the cooling circuit 2 between a point A, which, as shown in FIG. 1, is situated at the inlet of the evaporator 8, through a point B in the evaporator 8 to a point C at the outlet of the evaporator 8, is shown as curve 35 in FIG. 3, whereby the pressure difference between A and C is due to the aforementioned pressure drop in the evaporator 8.

Figure 4:
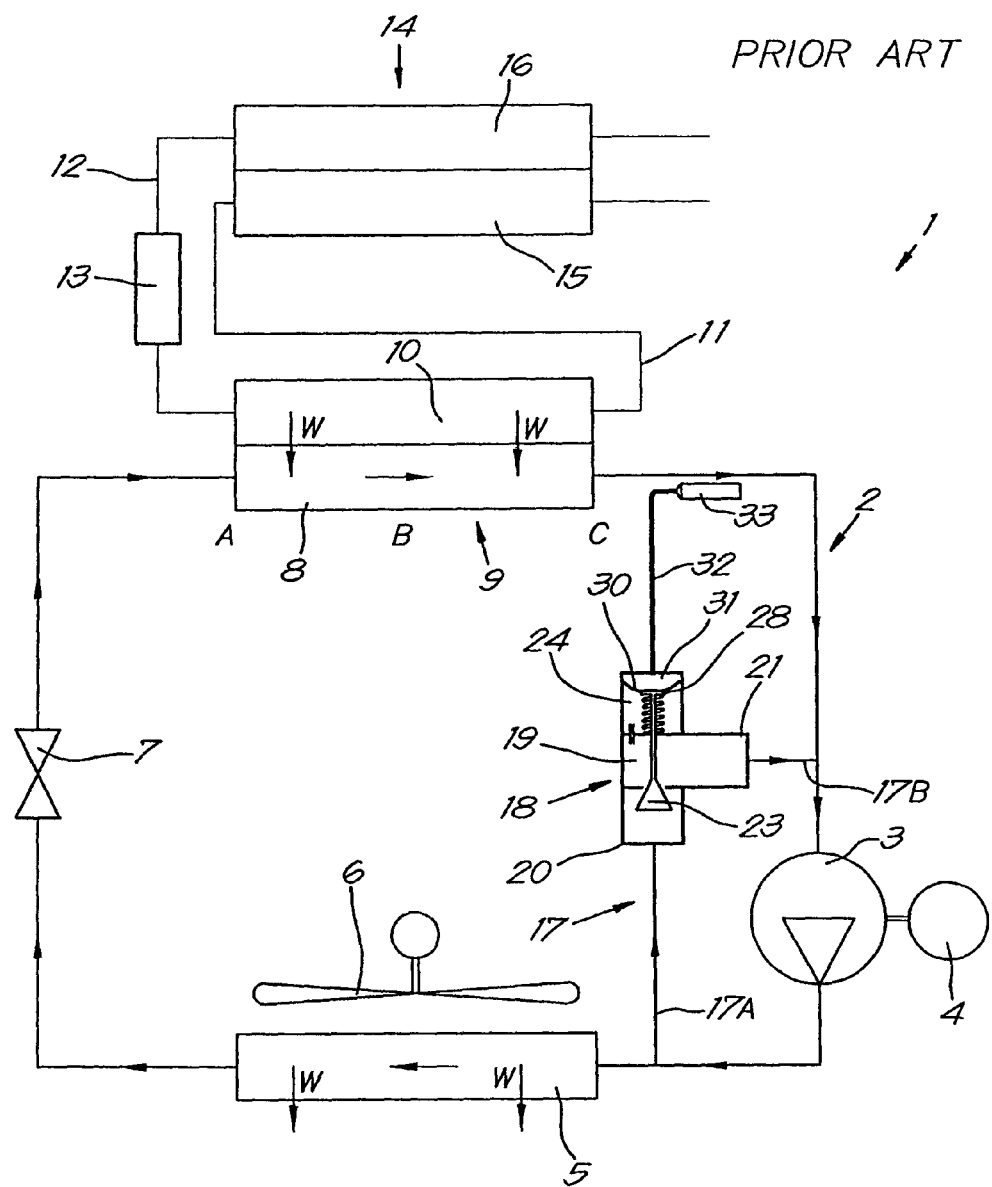
FIG. 4 shows the device of FIG. 1 in the unloaded state.

When the load is suddenly removed and no further gas to be dried flows through the heat exchanger 9, as schematically shown in FIG. 4, then there is no further heat supply to the coolant in the evaporator 8.

The evaporation of the coolant thus partly stops, such that the pressure in the evaporator decreases and thus also the pressure in the pressure chamber 24, and this pressure is in fact an underpressure that pulls the membrane 30 inwards into the pressure chamber 24. When the underpressure is sufficiently low, the force of the spring 29 is overcome by the strong suction force on the membrane 30 and the valve element 23 of the passage 22 is pushed away such that it opens.

The bypass pipe 17 is now open, such that a part of the flow compressed by the compressor 3 is immediately sucked in again by the compressor 3 without flowing through the condenser 5, expansion valve 7 and the evaporator 8, while the remaining flow still flows through the entire cooling circuit 2.

The pressure curve between points A and C in the unloaded state is shown as curve 36 in FIG. 3, in which the curve 35 of the loaded state is already shown.

The curve 35 of the loaded state is situated completely above the curve 36 of the unloaded state, which is due to the pressure increase that occurs in the evaporator 8 when loaded as a result of the heat transfer from the gas to be dried to the coolant in the evaporator 8 and due to the fact that the valve needs a certain pressure difference $\Delta p_{ref}$ to be able to act on the pressure increase.

The pressure curve according to the curve 35 in the loaded state is also steeper than the curve 36 in the unloaded state, which is the result of higher load losses in the evaporator 8 on account of the fact that in the loaded state, the entire flow flows through the evaporator 8, while in the unloaded state only a part of this flow flows through the evaporator 8 as the other part is diverted through the bypass pipe 17.

It is a characteristic of the bypass valve 18 that the pressure difference between the unloaded and loaded state at the point where the control pressure is tapped off approaches the constant value $\Delta p_{ref}$. This value $\Delta p_{ref}$ depends on various factors such as the pressure losses, the relative capacity of the compressor, the expansion and similar. In order to be able to bypass a certain power, a certain valve position difference is needed. A certain valve position difference always requires a fixed pressure difference: this is $\Delta p_{ref}$.

This $\Delta p_{ref}$ can be read from FIG. 3 at the point C, as the control pressure in the case of the known device is tapped off downstream of the evaporator 8.

FIG. 3 also schematically shows the 'freezing line' 37, which shows at what pressure there is a risk of freezing.

The device is generally set up so that the curve 36 in the unloaded state is just above this horizontal freezing line 37.

In the loaded state the curve 35 is situated far above the freezing line, which results in inefficient cooling with relatively high temperatures in the evaporator, and thus inefficient drying.

The invention is explained hereinafter on the basis of the device of FIG. 5 that differs from the known device of FIG. 1 in the fact that the pressure chamber 24 of the bypass valve 18 is connected via an external control pressure pipe 38 to the cooling circuit 2 at a point A upstream of the evaporator 8 instead of a point downstream of the evaporator 8.

The device 1 according to the invention, as was the case with the conventional device of FIG. 1, is set up such that in the unloaded state the pressure curve in the evaporator 8 is just above the freezing line 37.

Figure 5:
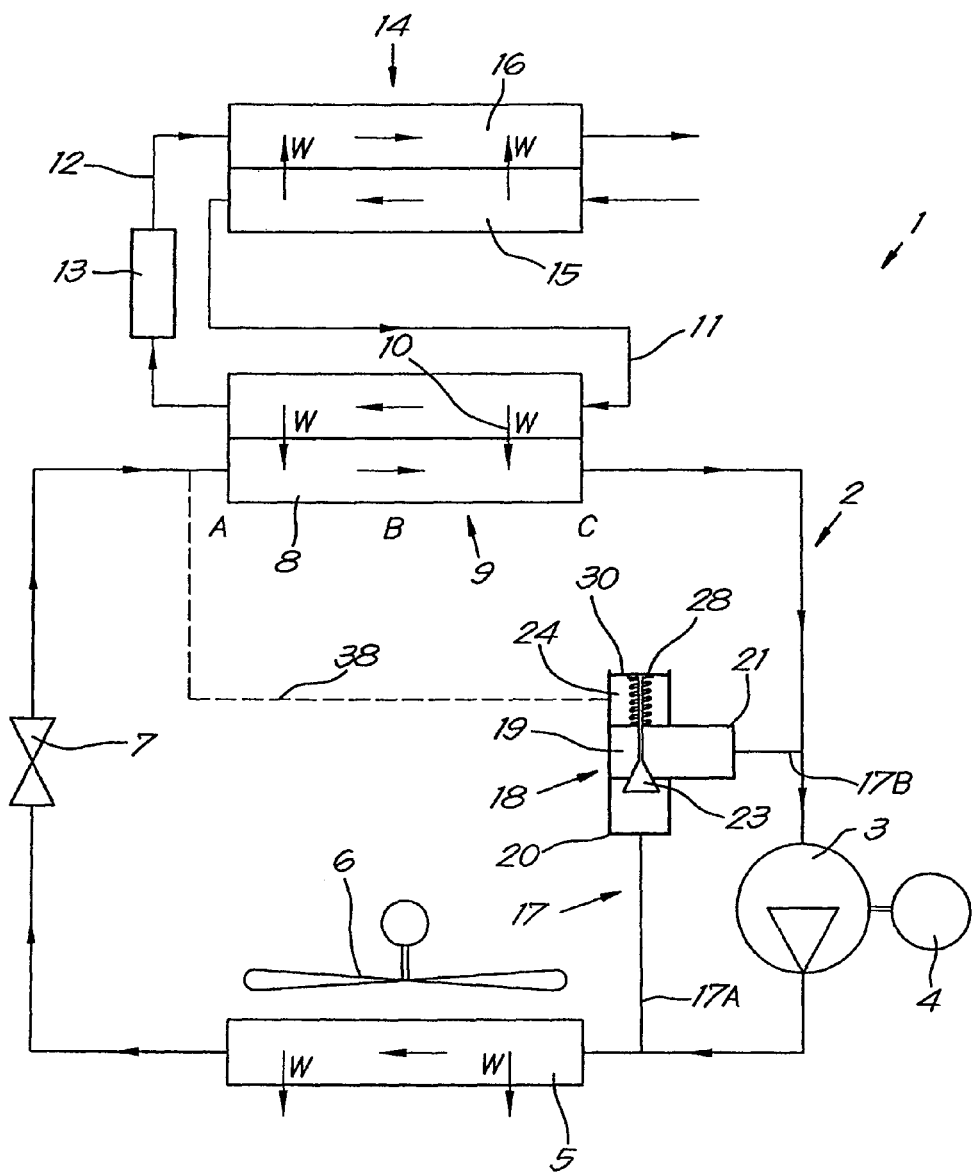
FIG. 5 schematically shows a device according to the invention.
Figure 6:
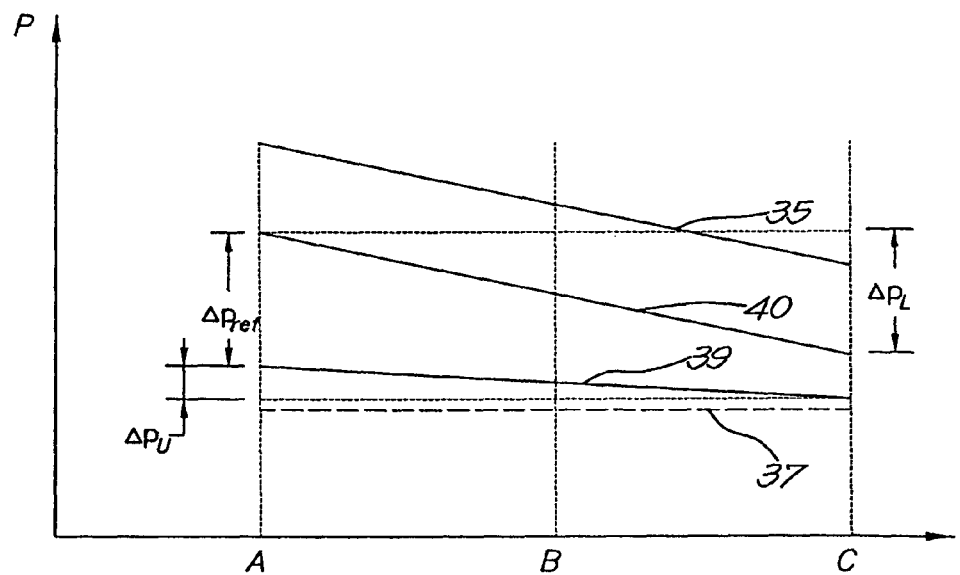
FIG. 6 shows the pressure curve of the coolant in the evaporator of FIG. 5.

This pressure curve in the unloaded state is shown in FIG. 6 for the device of FIG. 5 as curve 39, whereby this curve 39, given the aforementioned setting, coincides with the curve 36 of the conventional device.

In the event of changing from the unloaded to the loaded state, the effect of the connection of the external control pressure pipe 38 at point A upstream of the evaporator 8 can be seen, as now the aforementioned characteristic pressure difference $\Delta p_{ref}$ in the bypass valve 18 will be at point A instead of point C, as was the case in FIG. 3. This thus determines the pressure at point A when loaded.

The further change of pressure in the evaporator 8 when loaded is primarily determined by the load losses due to the flow of the coolant through the evaporator 8.

The pressure drop between A and C in the loaded state will be equal to the pressure drop between A and C in FIG. 3 for a cooling circuit with the same flow.

This results in the curve 40 when loaded, which is shown in FIG. 6 next to the corresponding curve 35 under a load for a conventional device.

An advantage of the invention is that the curve 39 in the case of the invention in the loaded state is lower with respect to the curve 35 for a similar conventional situation, and is thus closer to the aforementioned horizontal freezing line 37, such that the coolant can cool the air to be dried more intensively, which results in better drying.

It can be derived from FIG. 6 that due to the application of the invention, the curve 39 in the unloaded state and the curve 40 in the loaded state are closer together, which points to lower pressure and temperature differences occurring between a loaded and unloaded state, with a more constant pressure dew point of the dried air as a favourable result.

The second pressure chamber 31, the capillary tube 32 and the bulb 33 are not strictly necessary for the invention and can thus be omitted, as shown in FIG. 5, although they can also be present as they do not interfere with the invention.

Alternatively with respect to the embodiment of FIG. 5, the pressure control pipe 38 can also be connected to the closed cooling circuit 2 at a point in the evaporator 8, which means at a point in the inlet or at a point between the inlet and outlet of the evaporator 8. The favourable effect of the invention will then be all the greater as the point where the pressure control pipe 38 is connected to the closed cooling circuit 2 is located further upstream of the outlet of the evaporator 8.

What is important for obtaining the favourable effect of the invention is that the pressure control pipe 38 is connected to the closed cooling circuit 2 at a point upstream of the outlet of the evaporator 8 and at a distance from this outlet and preferably upstream of the evaporator 8.

Figure 7:
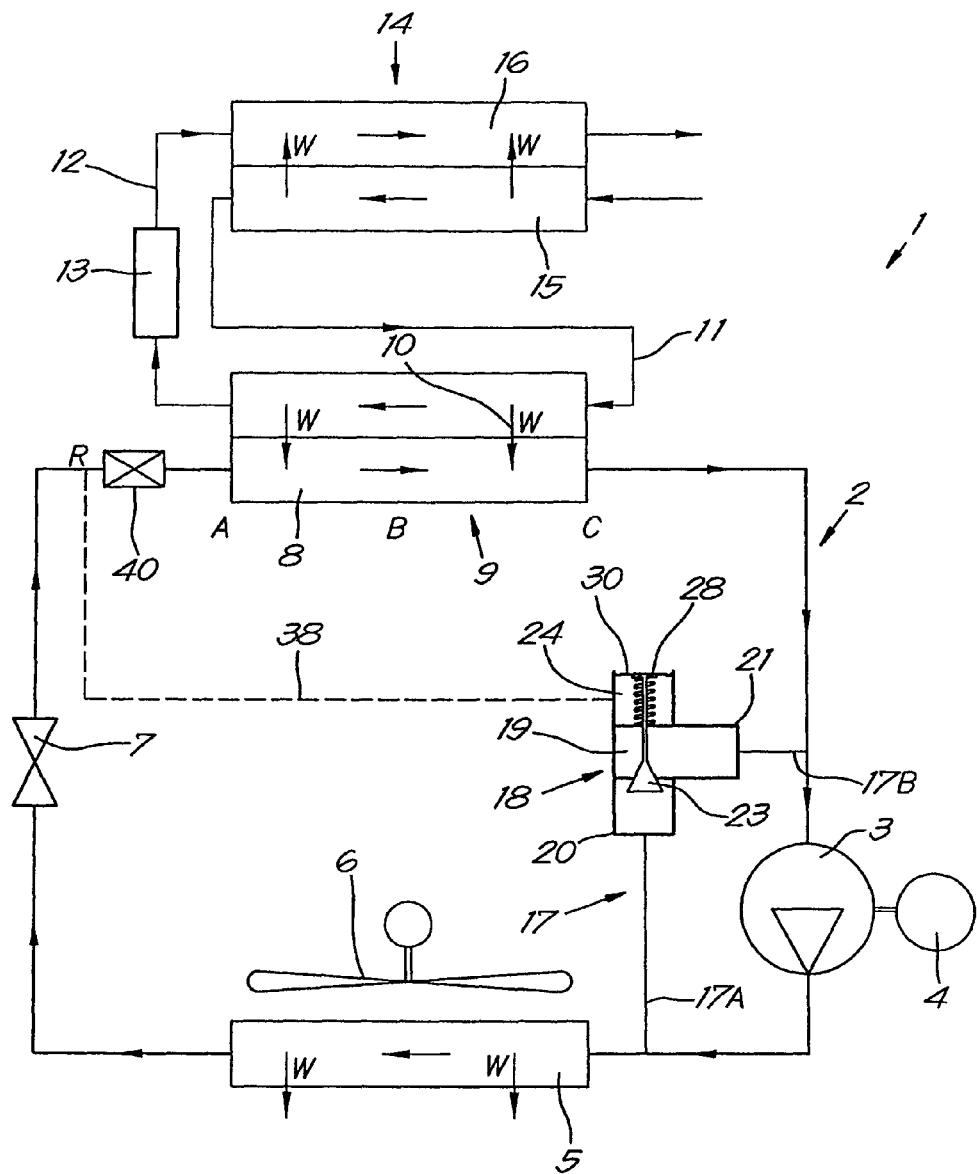
FIG. 7 shows a variant of a device according to the invention.

A variant of a device according to the invention is shown in FIG. 7, which differs from the device of FIG. 5 in that there is a restrictor 40 in the cooling circuit 2 upstream of the evaporator 8, more specifically between the inlet A of the evaporator 8 and the point R where the external control pressure pipe 38 is connected to the cooling circuit 2.

Figure 8:
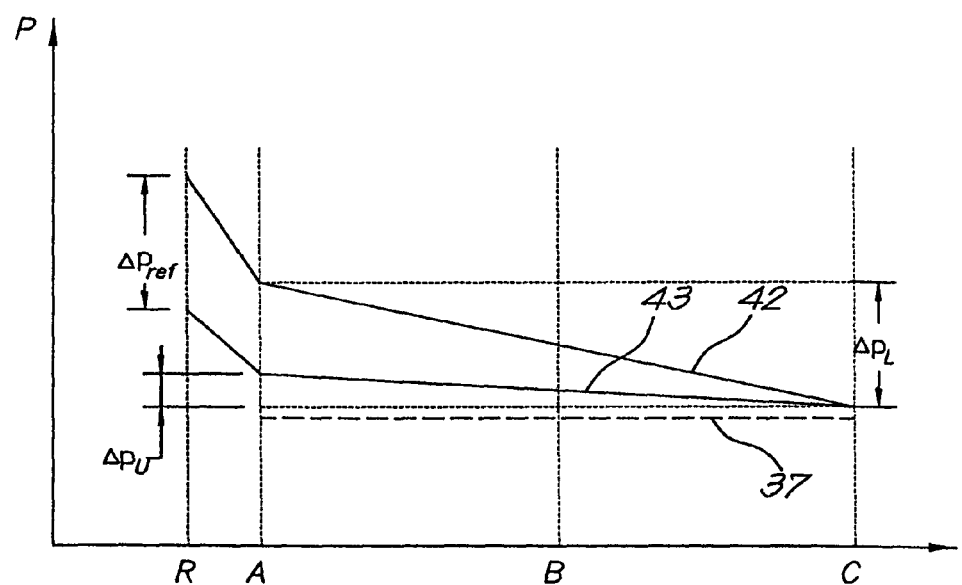
FIG. 8 shows the pressure curve of the coolant in the evaporator of FIG. 7.

The result of such a restrictor 40 is clearly shown on the basis of FIG. 8, which shows the pressure curve between the points R and C as curve 42 in the loaded state and curve 43 in the unloaded state.

The effect of the restrictor 40, both in the loaded and unloaded state, can be seen as a sharp pressure drop between R and A that is larger in the loaded state than in the unloaded state, as in the loaded state the entire flow of compressed coolant flows through the restrictor 40, while in the unloaded state only a part of it.

The pressure drop across the evaporator 8, in other words between points A and C, is similar to the situation of FIG. 6 without the restrictor 40.

The distance between the curves 42 and 43 is determined this time by the pressure difference $\Delta p_{ref}$ that is realised by the bypass valve 18 at the point R where the control pressure pipe 38 is connected to the cooling circuit 2.

It is clear from FIG. 8 that, thanks to the restrictor 40, the curves 42 and 43 are even closer together than the curves 39 and 40 of FIG. 6 for a situation without the restrictor 40, and the curve 42 is even closer to the freezing line 37 such that in the loaded state the cooling can be even deeper.

Through a suitable choice of the restrictor 40, it can be ensured that at point C at the outlet of the evaporator 8, the curves 42 and 43 coincide, such that at the outlet of the evaporator 8 there is no difference between a loaded and unloaded situation, or can even ensure that at this point the curve 42 is below the curve 43, and the loaded state enables cooling to a situation close to freezing.

Figure 9:
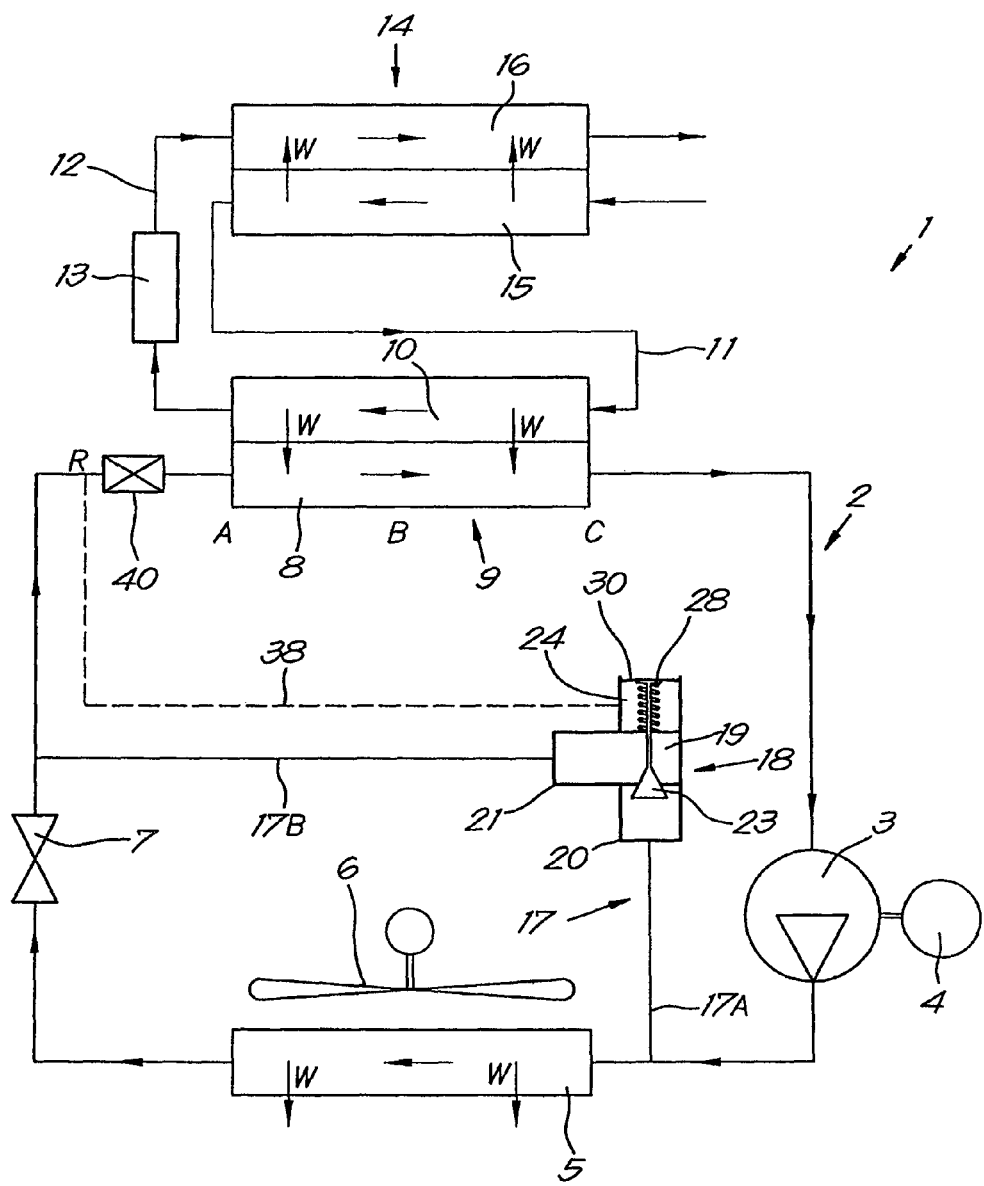
FIG. 9 shows a variant of a device according to the invention.

FIG. 9 shows another variant of the invention that also presents advantages with respect to the known devices as outlined in FIG. 1.

The device of FIG. 9 is analogous to that of FIG. 7, with the difference that the bypass pipe 17 not only bypasses the compressor 3, but also the evaporator 8 so that the same flow always flows through the evaporator 8, irrespective of whether the bypass valve 18 detects a loaded or unloaded state.

Figure 10:
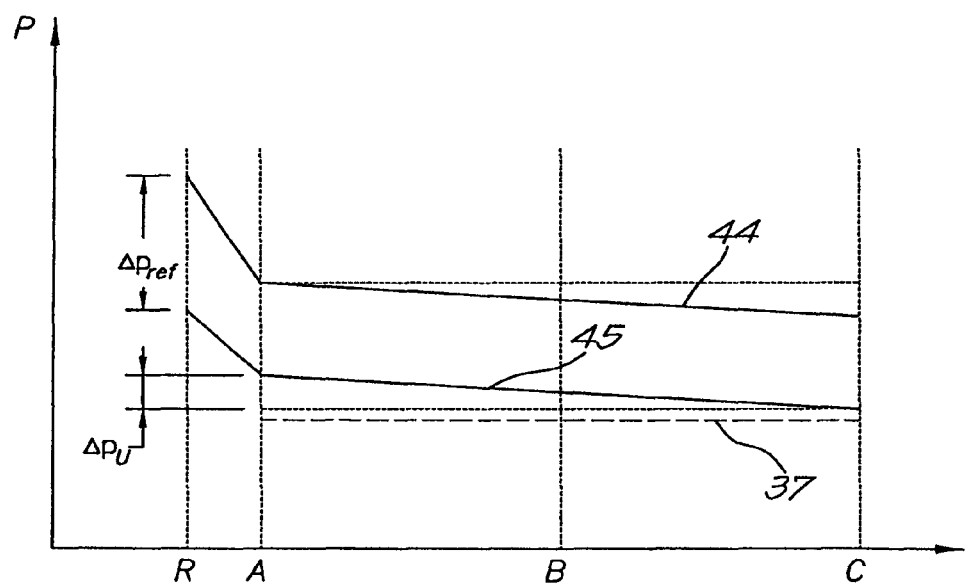
FIG. 10 shows the pressure curve of the coolant in the evaporator of FIG. 9.

The pressure drop in the evaporator will be the same in the loaded and unloaded state, which is illustrated in figure 10 with the curves 44 and 45 respectively for a loaded and unloaded state.

This shows the favourable effect of the restrictor 40 that brings both curves closer together compared to the existing situations.

It is clear that in all cases the bypass valve 18 is adjustable if need be, for example by adjusting the force of the spring.

The present invention is by no means limited to the embodiments described as an example and shown in the drawings, but a device and method for cool drying according to the invention can be realised in all kinds of variants, without departing from the scope of the invention.

The invention claimed is:

1. A device for cool drying a gas comprising:
a cooling circuit that is closed, the cooling circuit being arranged to contain a coolant to be circulated in the cooling circuit;
a compressor arranged to circulate a coolant in the cooling circuit, and in the direction of flow of the coolant successively, a condenser connected to an outlet of the compressor, an expansion device and an evaporator connected to an inlet of the compressor, said evaporator constituting a primary part of a heat exchanger, and having a secondary part through which the gas to be dried is guided;
a bypass pipe fluidly connected to the cooling circuit that is closable by a bypass valve comprising a valve element that is movable to a normally closed position under the influence of a spring element and a pressure-sensitive element that acts on the valve element, said pressure sensitive element, via a distinct control pressure pipe, being exposed to a local control pressure in the cooling circuit where the control pressure pipe is connected to the cooling circuit; and
wherein the control pressure pipe is connected to the cooling circuit upstream of the outlet of the evaporator.

2. The device according to claim 1, wherein the control pressure pipe is connected to the cooling circuit upstream of the evaporator.

3. The device according to claim 1, wherein one end of the bypass pipe is connected to the cooling circuit at a point located between the outlet of the compressor and the condenser and the other end is connected to a point along the cooling circuit located between the outlet of the evaporator and the inlet of the compressor.

4. The device according to claim 1, wherein one end of the bypass pipe is connected to the cooling circuit at a point located between the outlet of the compressor and the condenser, and the other end is connected to a point along the cooling circuit located between the expansion device and the inlet of the evaporator.

5. The device according to claim 1, wherein the bypass valve is arranged so that, when loaded, the valve element opens against the force of the spring element based upon a set value of the control pressure and wherein said value is adjustable.

6. The device according to claim 1, including a restrictor in the cooling circuit between the expansion device and the inlet of the evaporator.

7. The device according to claim 6, wherein the restrictor is configured so that, in the loaded state, the pressure of a coolant in the cooling circuit at the outlet of the evaporator is approximately equal to the pressure of a coolant at the outlet of the evaporator in an unloaded state.

8. The device according to claim 6, wherein the restrictor is configured so that, in the loaded state, the pressure of a coolant in the cooling circuit at the outlet of the evaporator is less than or equal to the pressure of a coolant at the outlet of the evaporator in an unloaded state.

9. The device according to claim 6, wherein the restrictor is configured so that, in the loaded state, the pressure of a selected coolant in the cooling circuit at the outlet of the evaporator has a temperature at the outlet of the evaporator that is equal, or approximately equal, to 0° C.

10. The device according to claim 1, wherein the bypass valve comprises an 'HGBP' valve (Hot Gas Bypass) with an external control pressure pipe.

11. The device according to claim 10,
wherein the bypass valve has a flow-through channel with a closable passage and a closed pressure chamber that is connected via the control pressure pipe to the cooling circuit, and the pressure-sensitive element comprises a membrane that closes an opening of the pressure chamber located opposite a separating wall between the flow-through channel and the pressure chamber,
wherein the valve element is arranged to close the passage and includes a valve stem that extends partly via a wall passage in the separating wall into the pressure chamber, and
wherein the end of the valve stem located in the pressure chamber has a spring seat for receiving a spring compressed between the separating wall and the spring seat, said spring holding the valve element in a closed position and the spring seat in contact with the pressure-sensitive element.

12. The device according to claim 10, wherein the bypass valve comprises an 'HGBP' valve (Hot Gas Bypass) without a temperature-sensitive bulb.

13. The device according to claim 1, wherein the compressor is driven by a constant speed drive.

14. A method for cool drying a gas by a drying device that includes a closed cooling circuit that contains a coolant that is circulated in the cooling circuit via a compressor, and which further includes, successively in the direction of flow of the coolant, a condenser connected to the outlet of the compressor; and an expansion device followed by an evaporator connected to the inlet of the compressor, said evaporator constituting a primary part of a heat exchanger having a secondary part through which the gas to be dried is guided, and wherein a bypass pipe in the cooling circuit is closeable by a bypass valve having a valve element that is held in a normally closed position under the influence of a spring element and a pressure-sensitive element that acts on the valve element, said pressure sensitive element, via a distinct control pressure pipe, being exposed to a local control pressure in the cooling circuit where the control pressure pipe is connected to the closed cooling circuit, comprising the step of:
opening the bypass valve against the spring force of the spring element when the pressure in the control pressure pipe is higher than a set value.

15. The method according to claim 14, including opening the bypass valve against the spring force of the spring element when the pressure in the closed cooling circuit at a point upstream of the evaporator is higher than a set value.

16. The method according to claim 14, including providing a restrictor in the cooling circuit between the expansion device and the inlet of the evaporator, said restrictor being configured such that in the loaded state the pressure of the coolant in the cooling circuit at the outlet of the evaporator is approximately equal to the pressure of the coolant at the outlet of the evaporator in an unloaded state.

17. The method according to claim 16, said restrictor being configured such that in the loaded state the pressure of the coolant in the cooling circuit at the outlet of the evaporator is less than or equal to the pressure of the coolant at the outlet of the evaporator in an unloaded state.

18. The method according to claim 16, said restrictor being configured such that in the loaded state the pressure of the coolant selected for the cooling circuit at the outlet of the evaporator will produce a corresponding temperature of the coolant at the outlet of the evaporator that is equal or approximately equal to 0° C.

19. A method for cool drying a gas by a drying device that includes a closed cooling circuit that contains a coolant that is circulated in the cooling circuit via a compressor, and which further includes, successively in the direction of flow of the coolant, a condenser connected to the outlet of the compressor; and an expansion device followed by an evaporator connected to the inlet of the compressor, said evaporator constituting a primary part of a heat exchanger having a secondary part through which the gas to be dried is guided, and wherein a bypass pipe in the cooling circuit is closeable by a bypass valve having a valve element that is held in a normally closed position under the influence of a spring element and a pressure-sensitive element that acts on the valve element, said pressure sensitive element, via a distinct control pressure pipe, being exposed to a local control pressure in the cooling circuit where the control pressure pipe is connected to the closed cooling circuit, comprising the step of:

opening the bypass valve against the spring force of the spring element when the pressure in the closed cooling circuit at a point upstream of the outlet of the evaporator is higher than a set value as determined via the control pressure pipe.

* * * * *